(12) United States Patent
James (10) Patent No.: US 12,143,833 B2
(45) Date of Patent: Nov. 12, 2024

(54) METHOD AND SYSTEM FOR POST-CONSTRUCTION CHECK-OUT PROCESSING

(71) Applicant: DISH Wireless L.L.C., Englewood, CO (US)

(72) Inventor: Paul James, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/321,548

(22) Filed: May 22, 2023

(65) Prior Publication Data

US 2023/0292146 A1    Sep. 14, 2023

Related U.S. Application Data

(63) Continuation of application No. 17/143,503, filed on Jan. 7, 2021, now Pat. No. 11,696,154.

(51) Int. Cl.
| | | |
|---|---|---|
| *H04W 16/28* | (2009.01) | |
| *H04B 17/27* | (2015.01) | |
| *H04W 64/00* | (2009.01) | |

(52) U.S. Cl.
CPC ............ *H04W 16/28* (2013.01); *H04B 17/27* (2015.01); *H04W 64/003* (2013.01)

(58) Field of Classification Search
CPC ..... H04B 17/27; H04W 64/003; H04W 16/28
See application file for complete search history.

(56) References Cited

U.S. PATENT DOCUMENTS

| | | | | |
|---|---|---|---|---|
| 2014/0153418 A1* | 6/2014 | Hariharan | .............. | H04W 24/10 370/252 |
| 2016/0366558 A1* | 12/2016 | Ngai | ...................... | H04W 4/023 |
| 2019/0130019 A1* | 5/2019 | De | ....................... | H04L 67/1097 |
| 2022/0004997 A1* | 1/2022 | Diamante | .............. | H04W 64/00 |
| 2022/0109498 A1* | 4/2022 | Vaez-Ghaemi | ...... | H04B 10/071 |

FOREIGN PATENT DOCUMENTS

CN        102695184 A    *    9/2012

* cited by examiner

*Primary Examiner* — Raymond S Dean
(74) *Attorney, Agent, or Firm* — KW Law, LLP (57) ABSTRACT

An example method of testing a cell site includes capturing a transmission from a radio at the cell site on a mobile device located at the cell site, receiving position data on the mobile device while capturing the transmission, and verifying that the position data identifies the cell site on the mobile device. The mobile device receives a signal from the radio at the cell site at a frequency and validates a measurement of a voltage standing wave ratio (VSWR) of the signal at the frequency. The mobile device validates a power up of the radio at the cell site without detecting an alarm, and the mobile device validates that a connection on a port of an antenna at the cell site is coupled to a low-band connection or a high-band connection.

20 Claims, 5 Drawing Sheets

METHOD AND SYSTEM FOR POST-CONSTRUCTION CHECK-OUT PROCESSING

CROSS-REFERENCE TO RELATED APPLICATIONS

This application is a continuation of U.S. patent application Ser. No. 17/143,503 filed on Jan. 7, 2021, and entitled METHOD AND SYSTEM FOR POST-CONSTRUCTION CHECK-OUT PROCESSING," which is incorporated herein by reference for any purpose.

TECHNICAL FIELD

The following discussion generally relates to wireless communications systems, and more particularly, to systems, methods, and apparatuses to validate radio frequency (RF) radios at cell sites by using testing software to validate a set of radio operations of a cell site prior to commissioning at a post-construction at the cell site.

BACKGROUND

Operators deploy the 5G New Radio (NR) networks and 5G devices at various sites worldwide. During the post-construction of the cell site, the general contractor, or others including the field operator, installer, vendor, etc. have to test the newly constructed 5G cell site installations in the field to ensure proper functionality of the cell site radio operations.

Prior to the actual commissioning of the cell site, a set of validation tests can be used to validate transmits in the cell sector covered by 5G cell sites in advance of the actual commissioning of the 5G cell site to forecast or to prevent any obstacles that may occur in advance of the actual commissioning of the 5G cell site. This can give the general contractor added assurances about the expected reliability to put into operation a particular 5G cell site.

It is desirable to provide a post-construction validation software tool operable at a cell site to perform a set of validations and tests of radio operations associated with a post constructed 5G cell site at about the time of the post-construction for use by the general contractor and others to generate data and assess in advance the reliability of the constructed 5G cell site and to ensure appropriate standards and operability are or will be met.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

SUMMARY

Systems, methods, and apparatuses are provided to validate radio operations at post-construction of a cell site.

A mobile testing system to validate radio operations at post-construction of a cell site is provided. The mobile testing system includes a processing device caused to execute testing software to validate at least one operation related to a radio of the cell site; a receiver coupled to the processing device with the capability to capture at least one transmit sent in a radio downlink in a cell sector; a location service coupled to the processing device with the capability to determine positional information during the capture of a downlink transmit of the radio in the cell sector; the processing device to cause the testing software to perform an analysis of the positional information and downlink transmit to identify the cell site by computation of directional angles derived about the downlink transmit. The processing device is configured to measure at least one operation data related to the radio at the cell site to perform at least one radio operation test configured by the testing software to validate at least one radio operation at the cell site.

In at least one exemplary embodiment, the system includes the processing device to perform at least one radio operation test configured by the testing software prior to the commission in the cell site's operation.

In at least one exemplary embodiment, the system includes the processing device to perform at least one radio operation test configured by the testing software to validate the radio's power-up at the cell site without the actuation of an alarm.

In at least one exemplary embodiment, the system includes the processing device, to perform at least one radio operation test configured by the testing software by operating the radio at the cell site at a minimal radio frequency to transmit a range of specified frequencies, to validate a measurement of a voltage standing wave ratio (VSWR) of the downlink transmit in a specified frequency.

In at least one exemplary embodiment, the system includes the processing device to perform at least one radio operation test configured by the testing software to check whether a radio frequency connect that is landed at a port of an antenna configured at the cell site is correctly coupled without mismatch to a low band connection or a high band connection of an antenna.

In at least one exemplary embodiment, the system includes the processing device to perform at least one radio operation test configured by the testing software to validate a radio detection of a Remote Electrical Tilt (RET) angle configured with the antenna and for the operation of an e-tilt movement of the antenna through a normal range at the cell site.

In at least one exemplary embodiment, the system includes the processing device to perform the at least one radio operation test configured by the testing software to validate a signal to noise (S/N) ratio of a RET angle configured with the antenna of a signal transmitted from the cell site.

In at least one exemplary embodiment, the system includes the processing device to perform at least one radio operation test configured by the testing software of an assignment of a radio fixed physical cell identifier (PCI) of a band in the cell sector.

In at least one exemplary embodiment, the system includes an app configured on user equipment (UE) in communication with the cell site to receive the radio fixed PCI and the processing device's positional information. The processing device performs at least one radio operation test configured by the testing software to validate the app's match with the UE in the cell sector.

In at least one exemplary embodiment, the system includes the processing device to perform at least one radio operation test configured by the testing software to compare an optimum value of a Reference Signal Received Power (RSRP) for each radio fixed PCI with the positional information in the cell sector to validate the integrity of a fiber connection by a fiber light level and radio frequency plumbing implemented at the cell site.

In another exemplary embodiment, a computer program product tangibly embodied in a computer-readable storage device and comprising a set of instructions that when executed by a processor to perform a method to validate at least one radio operation at a post-construction of a cell site is provided. The method includes executing, by the processor, at least one radio operation test by testing software to validate at least one operation related to a radio in the post-construction of the cell site; capturing, by a receiver coupled to the processor, at least one transmit sent in a downlink in a cell sector; determining, by a location service coupled to the processor, positional information during the capture of at least one downlink transmit in the cell sector; analyzing, by the testing software, of the positional information and the at least one downlink transmit to identify the cell site by computation of a directional angle derived about the downlink transmit; and validating, by the at least one radio operation test configured by the testing software, using a measurement of operation data of a radio of the cell site, at least one type of radio operation at the cell site.

In at least one exemplary embodiment, the system includes performing at least one radio operation test configured by the testing software prior to the commission in the cell site's operation.

In at least one exemplary embodiment, the system includes performing at least one radio operation test configured by the testing software to validate the radio's power-up at a cell site actuation of an alarm.

In at least one exemplary embodiment, the system includes validating, at least one radio operation test configured by the testing software by operating the radio at the cell site at a minimal radio frequency to transmit a range of specified frequencies, a measurement of a voltage standing wave ratio (VSWR) of radio transmissions in a specified frequency.

In at least one exemplary embodiment, the system includes checking, by at least one radio operation test configured by the testing software, whether certain radio frequency connects that are landed on a set of ports of antenna configured at the cell site are correctly coupled without mismatches to a plurality of low band connections and high band antenna couplings.

In at least one exemplary embodiment, the system includes validating, by at least one radio operation test configured by the testing software, radio detection of Remote Electrical Tilt (RET) angles configured with the antenna and for e-tilt movement of antenna operations through a range of movement at the cell site.

In yet another exemplary embodiment, an apparatus to validate at least one radio operation at a post-construction cell site is provided. The apparatus includes a processor caused to execute testing software to validate at least one operation related to a radio of the cell site; a receiver coupled to the processer with the capability to capture at least one transmit sent in a radio downlink in a cell sector; a location service connected to the processor with capability to determine positional information during the capture of a downlink transmit of the radio in the cell sector; the processor to cause the testing software to perform an analysis of the positional information and downlink transmit to identify the cell site by computation of directional angles derived about the downlink transmit; and the processor configured to measure at least one operation data related to the radio at the cell site for use to perform at least one radio operation test configured by the testing software to validate at least one radio operation at the cell site.

In at least one exemplary embodiment, the apparatus includes the processor to perform at least one radio operation test configured by the testing software prior to the commission in the cell site's operation.

In at least one exemplary embodiment, the apparatus includes the processor to perform at least one radio operation test configured by the testing software to validate the radio's power-up at the cell site without the actuation of an alarm.

In at least one exemplary embodiment, the apparatus includes the processor to perform at least one radio operation test configured by the testing software by operating the radio at the cell site at a minimal radio frequency to transmit a range of specified frequencies, to validate a measurement of a voltage standing wave ratio (VSWR) of the downlink transmit in a specified frequency.

This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Wireless mobile communication technology uses various standards and protocols to transmit data between a base transceiver station (BTS) and a wireless mobile device. The deployment of many small cells presents a need to validate radio operations at the post construction of the cell site to forecast obstacles and ensure reliability by the general contractor prior to commissioning the cell site.

In 3GPP radio access networks (RANs) in LTE systems, the BTS can be a combination of evolved Node Bs (also commonly denoted as enhanced Node Bs, eNodeBs, or eNBs) and Radio Network Controllers (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

Figure 1:
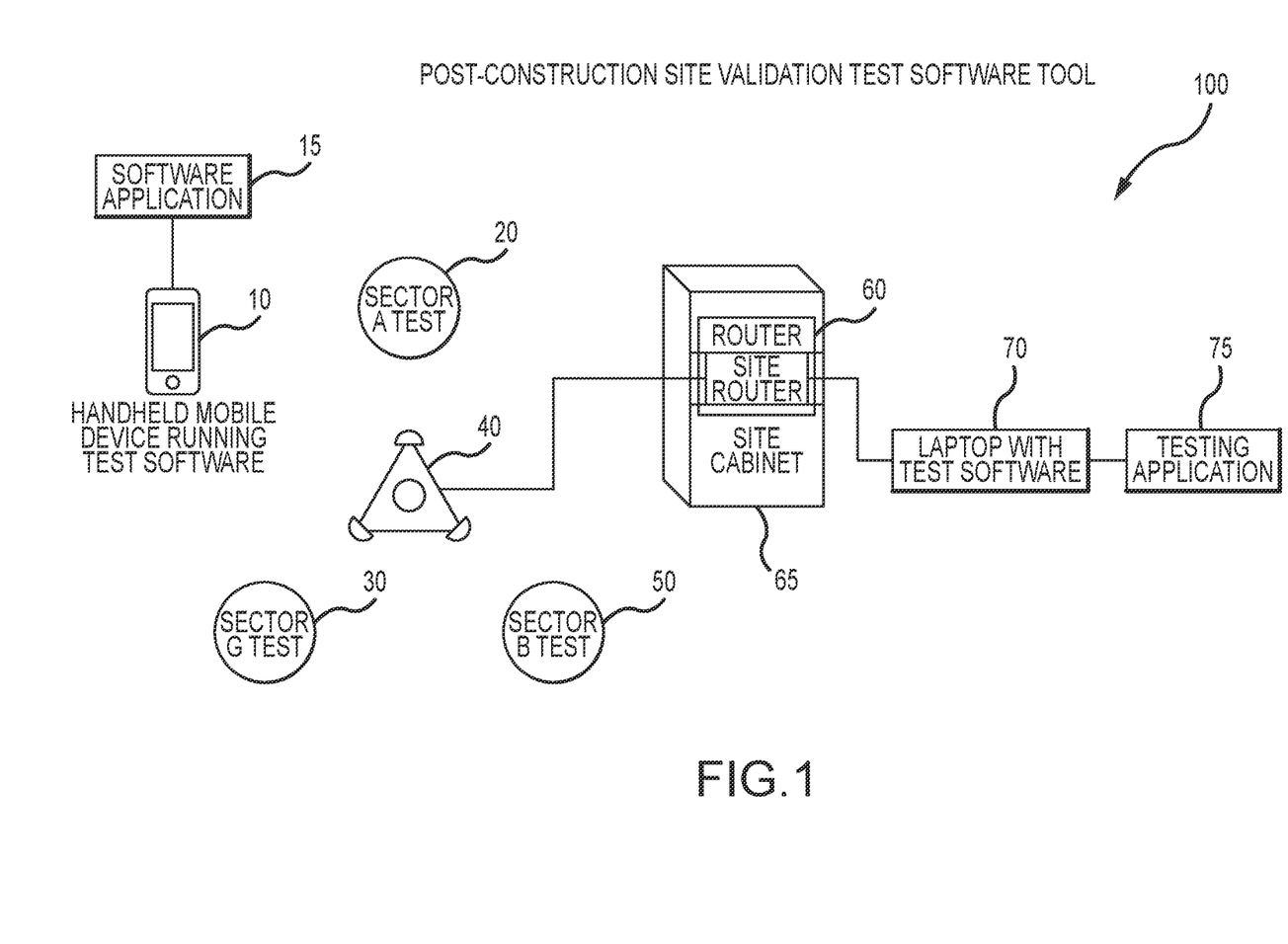
FIG. 1 is an exemplary embodiment of a post-construction site validation test software for a cell site in accordance with an embodiment.

FIG. 1 is an exemplary embodiment of a post construction site validation test software tool in a wireless data networking environment in accordance with an embodiment. FIG. 1. includes a handheld mobile device 10 that listens for specific PCIs in downlink transmits. The handheld mobile device 10 is configured with a built-in GPS service to generate geographical data for a software application 15 (hosted in part or in communication with the handheld mobile device 10) to receive the geographical data to correlate which cell site a handheld mobile device 15 is located, and what is the direction and azimuth angles are pointing of the transmits in each cell sector. The software application (or testing software) 15 directs the user to the optimal locations with the handheld mobile device 10 to take downlink measurements by executions of algorithms of the software application 15. The handheld mobile device 10 links and communicates data generated by the software application 15 to other testing software 75 hosted by a laptop device 70 via a router 60 at a site cabinet 65. The handheld mobile device 10 links back to the laptop device 70 at the end of the test to report downlink data.

The laptop 70 with the testing software 75 can be any computing device or other data processing apparatus or system usable by users to access the router 60. For example, any of a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network to the router 60. The "laptop" 70 is "computing device" that typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user to access, process and view information, pages and applications available to over a network.

In various exemplary embodiments, the data that is downlink can be formatted in a file or sent in packet and can include date and time data when the test is performed and the name of a certain site with site identification information such as a site ID. The location information can be detected in the test and is based on geographical location, GPS coordinates of each sector test, results of test data including PCIs received and associated RSRP, RSRQ signal quality measurements.

The laptop device 70 is connected to a specific port on router 60. The testing software 75 is configured to scan the router ports of the router 60 to automatically discover a radio 40 connected to a router port or a set of radio devices connected to multiple router ports. The testing software 75 configures the radio 40, which is discovered for a test. The testing software 75 measures eCPRI light levels of the radio 40, places the radio 40 into a transmit mode to generate a specific PCIs per radio per sector (20, 30, 50), executes a series of query operations to the radio to generate Voltage Standing Wave Ratio (VSWR) values of mismatch amounts between an antenna Remote Electrical Tilt (RET) connection (i.e., the feed line) to each radio. The testing software 75 drives the RET in a full range and reset the RET back to zero when the test is completed. The testing software 75 collects and records the radio 40 signal to noise (S/N) values, validates MAC addresses, Received Signal Strength Indication (RSSI) values, RET S/Ns values associated with each radio 40, and any alarms present. When executed, the laptop device 70 pairs up with the testing software 75 and the Handheld Mobile Device 10 in part to retrieve downlink transmit data and provide pass and fail validation results. The validation results are reported to the specific server over the network.

Figure 2:
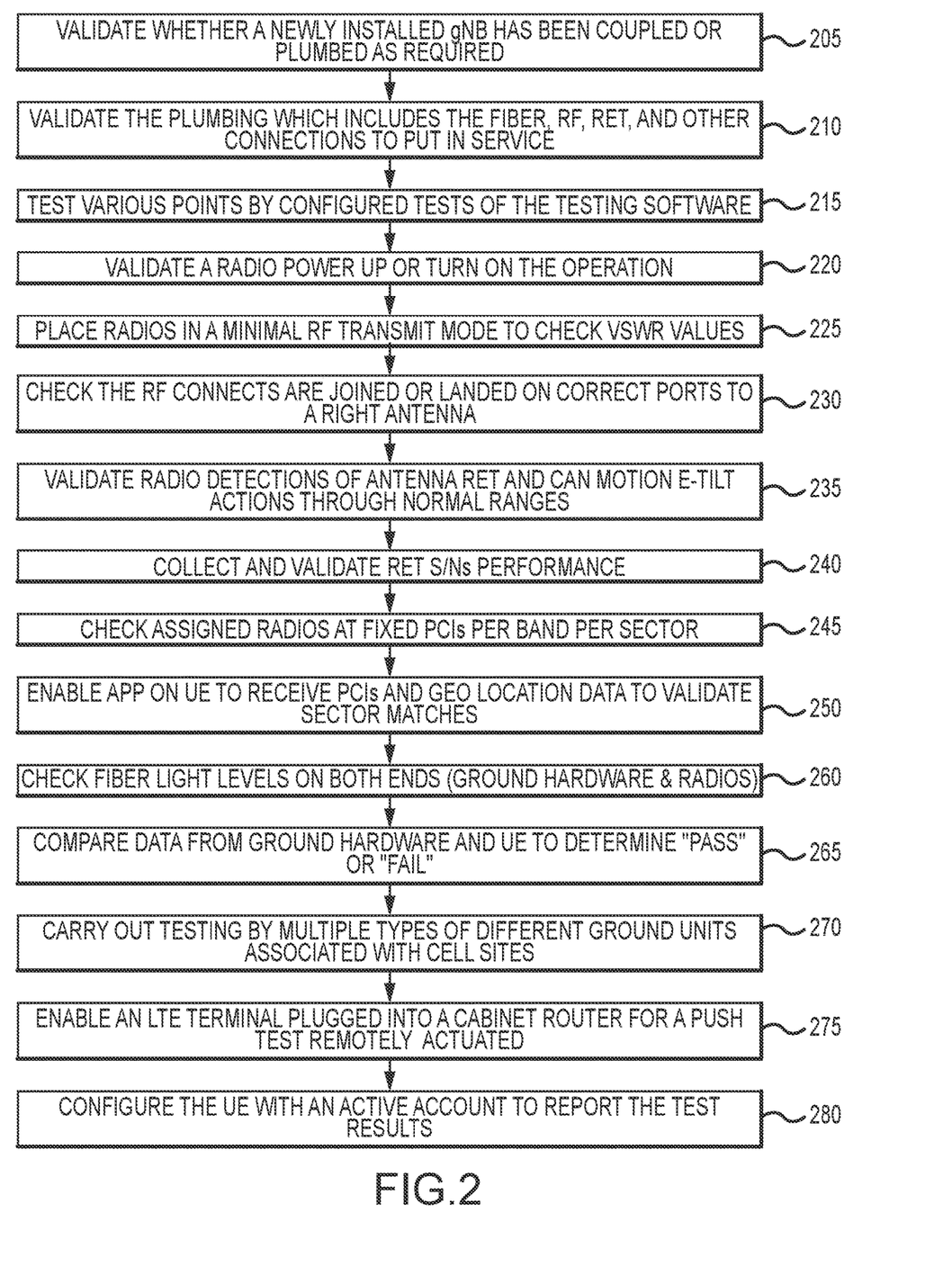
FIG. 2 is an exemplary flowchart of a set of radio operation tests by the testing software to validate operations of the radio at the cell at a post-construction stage in accordance with an embodiment.

FIG. 2 is an exemplary flowchart of a set of radio operation tests by the testing software to validate the radio's operations at the cell at a post-construction stage in accordance with an embodiment. In FIG. 2, at step 205, the testing software validates whether a newly installed gNB has been coupled or plumbed as required with the appropriate connections by a general contractor, builder, assembler, etc. before any of the project personnel have departed from the cell site and completed this installation work. At step 210, the plumbing can include installing the fiber, RF, RET, and other connections to put in service or turn on the cell site. The plumbing also includes actions while radios are active with collecting VSWR and RSSI data. The plumbing is prior to the cell site's commissioning and is a checking or testing whether the cell site is suitable to be commissioned. At step 215, various points are tested by configured tests of the testing software. For example, at step 220, the testing software validates a radio power up or turn on the operation. It is tested without alarms so as not to damage any required handling and installation operations. At step 225, the radios are placed in a minimal RF transmit mode on specified frequencies to check VSWR values. This testing validates at step 230, that RF connects are joined or landed on correct ports to a right antenna (i.e., no mismatch of low band/high band connections has incurred). At step 235, the validated radio detects antenna RET and can motion e-tilt actions through normal, or convention desired ranges. At step 240, collecting and validating of RET S/Ns is performed. At step 245, assign radios are fixed PCIs per band per sector (will use small range of PCIs set aside to avoid operational issues).

At step 250, an app configured on user equipment (UE) is enabled to receive PCIs and geo location data to validate sector matches. This validation action requires all or nearly all available radios transmitting at the same or similar time. The UE can also implement the testing software to compare the best RSRP/RSRQ per PCI that is received and relates to an expected geo-location/sector to validate fiber and RF plumbing (no swapped sectors).

At step 260, the testing software reports fiber light levels on both ends (ground hardware & radios) to ensure the fiber is clean and the end to end loss is minimal. At step 265, the testing software compares data from ground hardware and UE to determine "pass" or "fail" results and generate a "pass" or "fail" report of errors or validations automatically to the server. In an exemplary embodiment, the "fail" report may include sufficient details of the identified errors to enable a user to identify the cause and troubleshoot with a set of appropriate responsive hardware or software changes or corrections to address the errors. Subsequently, after making all the corrections and changes, the system can be retested to confirm that the reported errors have been overcome and no longer triggered.

In an exemplary embodiment, the "pass" report may include a series of tests and test log data associated with a set of metrics. The tested metrics can include the following:

RU S/N and MAC addresses for each radio in each sector and the associated antenna RET S/N data (this is feedback to the NX1 and the EMS).

The mid-haul data is not required to validate the site as the UE is configured in a passive mode when measuring PCI and GPS location. For the UE to execute the testing software at the cell site, the testing software requires the cell site RFDS/CIQ information to calculate by a various algorithm implemented by the testing software, a set of sector patterns in relation to antenna locations of the cell site to qualify for a "pass" or "fail" report for various metrics associated with the sector patterns.

At step 270, the testing software is configured to be carried out by multiple types of different ground units associated with cell sites (CSR, DU, VEP, or external laptops) and UE rendering an app. The data gathered from the ground units are necessitated to be synced to a UE app (via Bluetooth or Wi-Fi connections) for collection for the radio alarm, VSWR, RET, and fiber light level data.

At step 275, an alternate embodiment is configured to enable an LTE terminal plugged into a cabinet router for a push test remotely actuated (and also automatic). In this case, the UE must operate with an app and be configured to sync to generate a pass and a fail report based on a validity test.

At step 280, in another exemplary embodiment, the UE is configured with an active account to report the test results.

Figure 3:
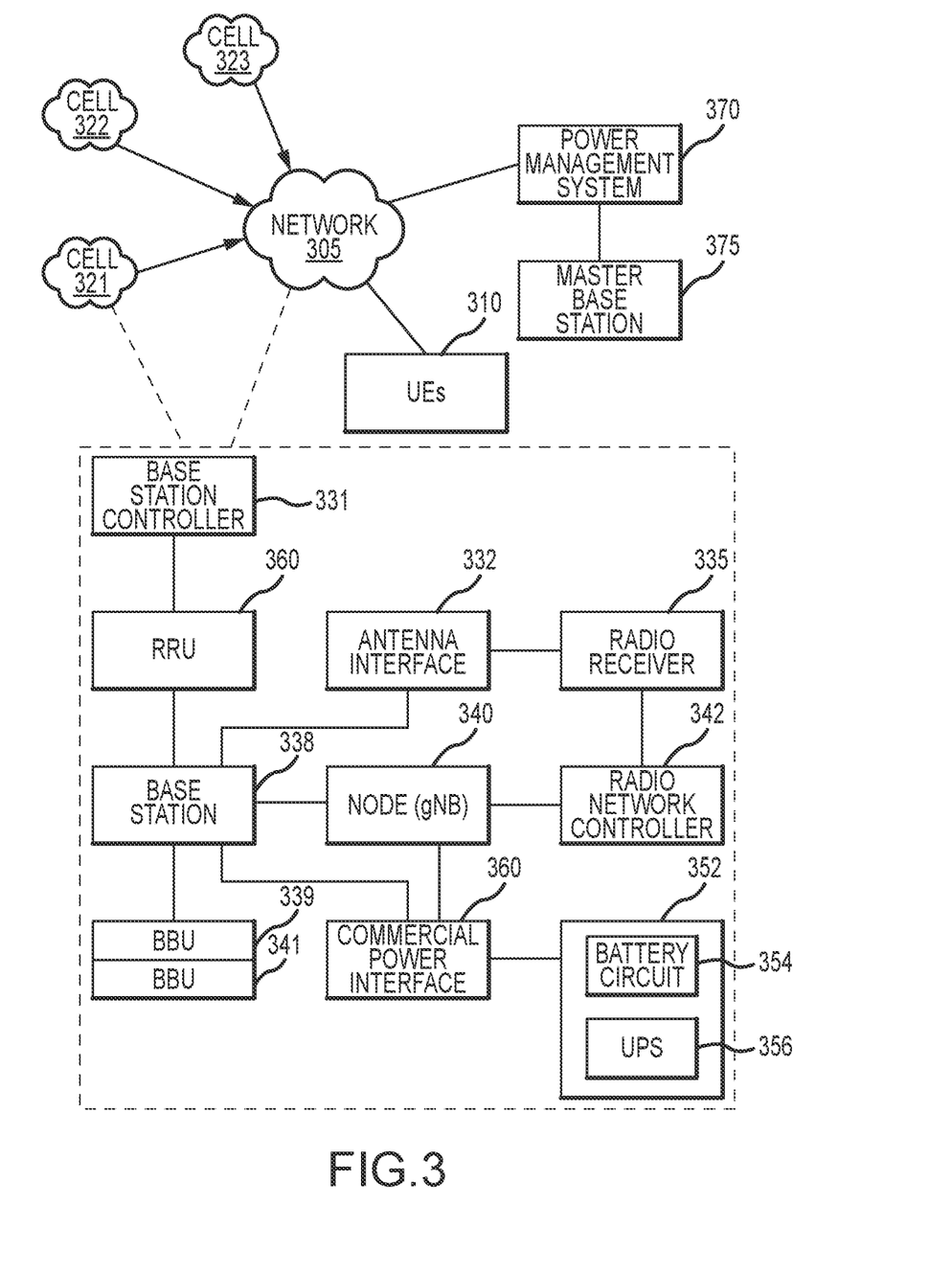
FIG. 3 is an exemplary diagram of components of a post constructed 5G cell site including a base station and power management systems in accordance with an embodiment.

FIG. 3 illustrates the various components for a cell site configuration in accordance with an exemplary embodiment. The cell site configuration includes a 5G or other data networks 100 that includes multiple cells 121, 122, 123 that provide access to a network 105 for any number of UE devices 110. Although FIG. 3 shows only one user equipment (UE) device 110 for simplicity. In practice, the concepts described herein may be scaled to support environments 100 that include any number of devices 110 and/or cells 121-123, as well as any sort of network architecture for assigning bandwidth to different slices and performing other tasks, as desired.

In the example of FIG. 3, a mobile telephone or other user equipment (UE) device 310 suitably attempts to connect to network 305 via an appropriate access cell 321, 322, 323. In the illustrated example, each cell 321 includes the components for transmission of a base station controller 331, a base station transceiver 338, a node 340, an RF Radio 335, a Radio Network controller 342; the linking components of the antenna interface 332 and the antenna 333; and the power components of the commercial power interface 350, the backup power supply 352 of a battery circuitry 354 and UPS or batteries 356.

The commercial power interface 350 may receive power AC power from a public utility or other sources. The antenna 333 and antenna interface 332 control the signal to the UEs 310. The radio network controller 342 can control the RF transmit output via the RF radio 335 to conserve power usage to reduce the power draw on the USP 356. By reducing the communication bit rate, the RF power can be reduced in decibels ("dB"). Additionally, step reductions can be implemented. The battery circuit 354 can be configured as a rectifier type switch that can switch the output power from the UPS 356 at multiple levels. The Base Station controller 338 can include power control features to control the power drawn by the base station 338. Additionally, the base station controller 338 can communicate wirelessly with a power management system 370 that can confirm the power outage or interrupt on the front end to change the power input power levels of multiple small cells 321, 322, and 323, and a number of UEs 310 connected to the Node 340 and resources in a slice of a node (gNB).

For example, the radio network controller 331 can implement logic with computer-executable instructions stored in a memory, hard drive, or other non-transitory storage of device for execution by a processor contained within. Also, the radio network controller 331 can be configured with a remote radio unit (RRU) 360 for downlink and uplink channel processing. The RRU can be configured to communicate with a baseband unit (BBU) of a base station controller 331 via a physical communication link and communicate with a wireless mobile device via an air interface.

In various alternate embodiments, the base station 338 can be separated into two parts, the Baseband Unit (BBU) 339 and the Remote Radio Head (RRH) 341, which provides network operators to maintain or increase the number of network access points (RRHs) for the Node (gNB), while centralizing the baseband processing functions at a master base station 375. Using a master C-RAN base station 375, the power management system 370 can be instructed to coordinate operations in the tangent of power levels of multiple cells (321, 322, and 323).

Figure 4:
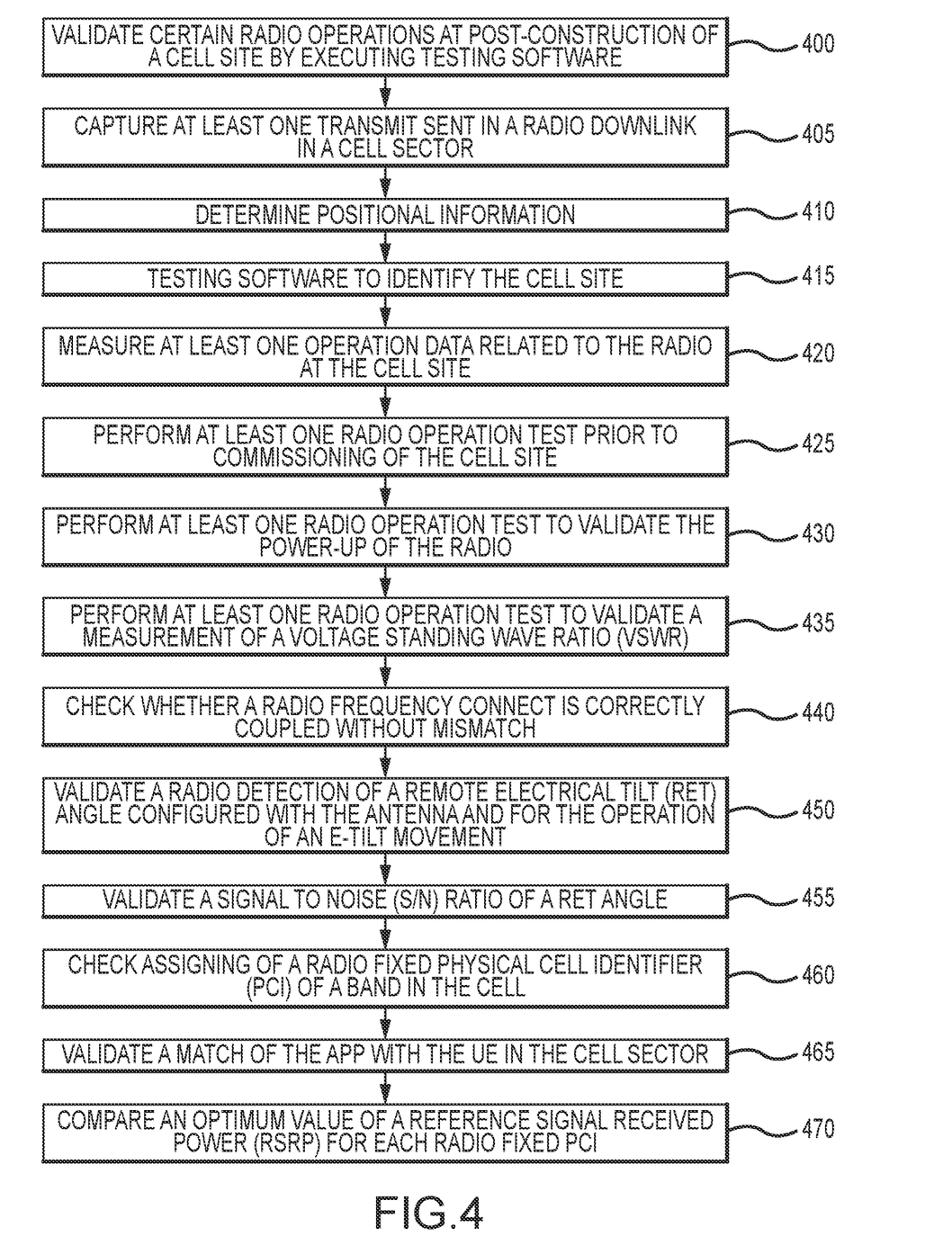
FIG. 4 is an exemplary flowchart of a set of radio operation tests by the testing software to validate operations of the radio at the cell at a post-construction stage in accordance with an embodiment.

FIG. 4 illustrates an exemplary flowchart of the set of tests to validate a set of radio operations of a cell site at a post-construction stage, in accordance with an embodiment.

At step 400, a mobile testing system validates certain radio operations at post-construction of a cell site by executing testing software to validate at least one operation related to a radio of the cell site. At step 405, a receiver that is coupled to the processor of a handheld mobile device with the capability to capture at least one transmit sent in a radio downlink in a cell sector. At step 410, a GPS service with the handheld mobile device is configured with the capability to determine positional information during the capture of a downlink transmit of the radio in the cell sector. At step 415, the handheld mobile device causes the testing software to perform an analysis of the positional information and downlink transmits to identify the cell site by computation of directional angles derived from the downlink transmit. At step 420, the handheld mobile device together with the testing software and a linked laptop have processing capability in part or together that is configured to measure at least one operation data related to the radio at the cell site for use to perform at least one radio operation test configured by the testing software to validate at least one radio operation at the cell site. At step 425, the handheld mobile device, together with the laptop or in part, can perform at least one radio operation test configured by the testing software prior to commissioning in the operation of the cell site. At step 430, the handheld mobile device performs at least one radio operation test configured by the testing software to validate the power-up of the radio at the cell site without the actuation of an alarm. At step 435, the handheld mobile device performs at least one radio operation test configured by the testing software by operating the radio at the cell site at a minimal radio frequency to transmit a range of specified frequencies, to validate a measurement of a voltage standing wave ratio (VSWR) of the downlink transmit in a specified frequency. At step 440, the handheld mobile device performs at least one radio operation test configured by the testing software to check whether a radio frequency connect that is landed at a port of an antenna configured at the cell site is correctly coupled without mismatch to a low band connection or a high band connection of an antenna.

At step 450, the handheld mobile device performs at least one radio operation test configured by the testing software to validate a radio detection of a Remote Electrical Tilt (RET)

angle configured with the antenna and for the operation of an e-tilt movement of the antenna through a normal range at the cell site. At step 455, the handheld mobile device performs at least one radio operation test configured by the testing software to validate a signal to noise (S/N) ratio of a RET angle configured with the antenna of a signal transmitted from the cell site. At step 460, the handheld mobile device performs at least one radio operation test configured by the testing software of an assignment of a radio fixed physical cell identifier (PCI) of a band in the cell sector.

At step 465, an app is configured on user equipment (UE) in communication with the cell site to receive the radio fixed PCI and the positional information; and the handheld mobile device performs at least one radio operation test configured by the testing software to validate a match of the app with the UE in the cell sector. At step 470, the handheld mobile device performs at least one radio operation test configured by the testing software to compare an optimum value of a Reference Signal Received Power (RSRP) for each radio fixed PCI with the positional information in the cell sector to validate the integrity of a fiber connection by a fiber light level and radio frequency plumbing implemented at the cell site.

Figure 5:
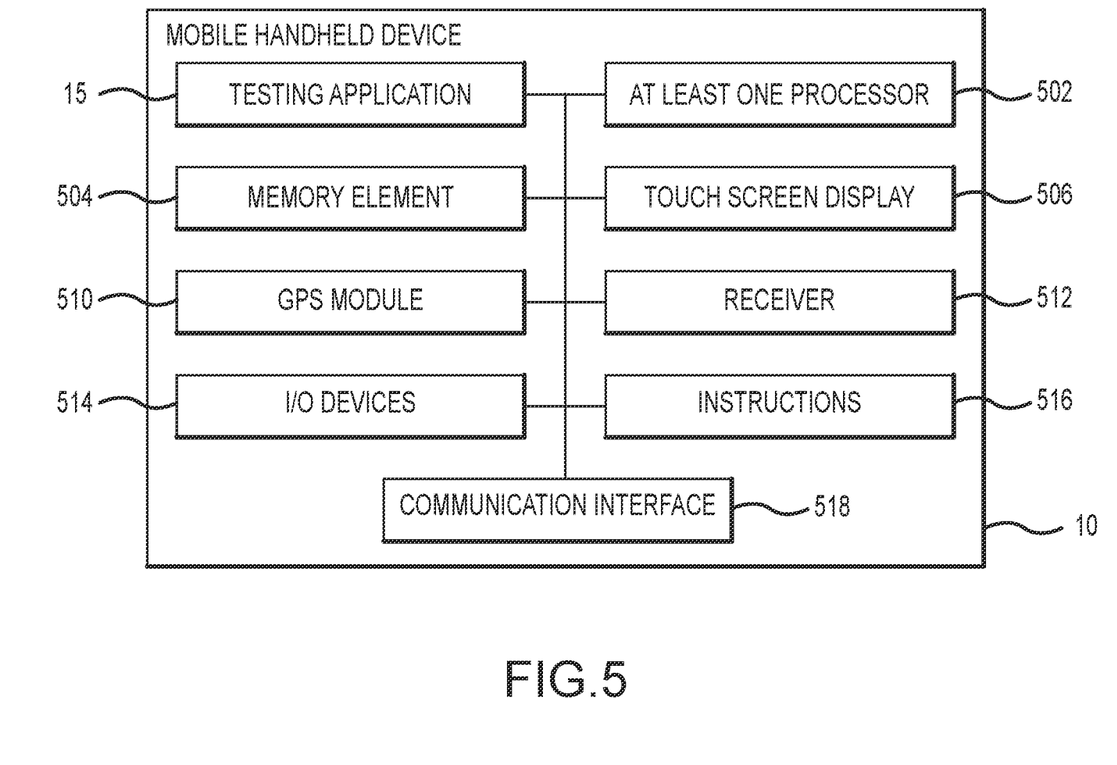
FIG. 5 is an exemplary diagram of components of a handheld mobile device to implement the testing software for the validation tests at the post-construction stage of the 5G cell site in accordance with an embodiment.

FIG. 5 illustrates an exemplary mobile handheld device (device) 10 with a testing application 15 in FIG. 1. The handheld mobile device 10 is depicted in a simplified block diagram representation of an exemplary embodiment of a computer-based device that supports the implementation of the testing application 15 with capabilities to monitor downlink transmission of a cell site 40. The device 10 generally includes, without limitation: at least one processor device 502; at least one memory element 504; a touchscreen display 506; at least one communication (network) interface 508; a GPS module 510, a receiver 512 capable of monitoring and listing to multiple different bandwidths of signals transmitted in a downlink from a cell site (40 in FIG. 1), input and output (I/O) devices 514, and capabilities to communicate via Bluetooth, cellular and wi-Fi. In practice, device 10 can include additional components, elements, and functionality that may be conventional or unrelated to the testing functionality described here. In this regard, device 10 can include a touchpad, or the like, instead of or in addition to the touchscreen display 506, as well as a microphone for capturing audio. The touchscreen display 506 of a user interface component can be utilized with device 10 for actuating the client app (i.e., the testing application 15) for listening to transmitted downlink signals. In some instances, the user activation selection may be in the form of a physical actuation on the touchscreen display 506; in other instances, user activation may be triggered by natural language processing (NLP) of voiced user commands by applications of the device 10.

The mobile device may include components of a processor 502, for example, which may include a central processing unit (CPU), a field-programmable gate array (FPGA), a microcontroller, an application-specific integrated circuit (ASIC), or any other logic device or a combination thereof; a memory element 504 which is communicatively coupled to the processor 502, and can be implemented with any combination of volatile and non-volatile memory. The memory element 504 has non-transitory computer-executable instructions (program code) 516 stored thereon, wherein the instructions 516 are configurable to be executed by the processor device 502 as needed. When executed by the processor device 502, the instructions 516 cause the processor device 502 to perform the associated tasks, processes, and operations defined by the instructions 516. Of course, the memory element 504 may also include instructions associated with a file system of the host device and instructions associated with other applications or programs. Moreover, the memory element 504 can serve as a data storage unit for the host device. For example, the memory element 504 can provide a storage buffer for audio packets or the like that are processed in part locally or note and are sent to a remote application server for further processing.

The touchscreen display 506 may be integrated with the device 10 or communicatively coupled to the device 10 as a peripheral or accessory component. The shape, size, resolution, and technology of the touchscreen display 506 will be appropriate to the particular implementation of the device 10. The touchscreen display 506 can be realized as a monitor, screen, or another conventional electronic display that is capable of graphically presenting data and/or information provided by the device 10. The touchscreen display 506 is communicatively coupled to the processor device 502, and it can leverage existing technology to detect touch gestures and contact with a user's finger (or fingers), a stylus, or the like. In addition, the touchscreen display 506 is suitably configured to generate or otherwise provide activation control information that is associated with touch and force detected at the surface of the touchscreen display 506.

The communication interface 518 of device 10 represents the hardware, software, and processing logic that enables device 10 to support data communication with other devices. In practice, the communication interface 518 can be suitably configured to support wireless and/or wired data communication protocols as appropriate to the particular embodiment. For example, if device 10 is a smartphone, then the communication interface 518 can be designed to support a cellular communication protocol, a short-range wireless protocol (such as the BLUETOOTH communication protocol), and a WLAN protocol. As another example, if the device 10 is a desktop or laptop computer, then the communication interface can be designed to support the BLUETOOTH communication protocol, a WLAN protocol, and a LAN communication protocol (e.g., Ethernet). In practice, the communication interface 518 enables the mobile handheld device 10 to receive media content for presentation on the touchscreen display 506, wherein the media content can be downloaded, streamed, or otherwise provided for real-time (or near real-time) playback or for storage at the mobile handheld device 10.

The I/O devices 514 of device 10 enable the user of device 10 to interact with the device 10 as needed. In practice, the I/O devices 514 may include, without limitation: a speaker, an audio transducer, or other audio feedback components; a haptic feedback device; a microphone; a mouse or other pointing device; a touchscreen or touchpad device; a keyboard; a joystick; or any conventional peripheral device. In this context, the touchscreen display 506 can be categorized as an I/O device 514.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of the various features described herein without departing from the scope of the claims and their legal equivalents.

As described, a data networking system includes several data processing components, each of which is patentable, and/or have patentable aspects, and/or having processing hardware capable of performing automated processes that are patentable. This document is not intended to limit the scope of any claims or inventions in any way, and the various components and aspects of the system described herein may be separately implemented apart from the other aspects.

The invention claimed is:

1. A method of testing a cell site, comprising:
capturing a transmission from a radio at the cell site on a mobile device located at the cell site;
receiving, on the mobile device, position data while capturing the transmission;
verifying, by the mobile device, the position data identifies the cell site;
receiving, on the mobile device, a signal from the radio at the cell site at a frequency;
validating, on the mobile device, a measurement of a voltage standing wave ratio (VSWR) of the signal at the frequency;
validating an assignment of a physical cell identifier (PCI) of a band at the cell site; and
comparing an optimum value of a Reference Signal Received Power (RSRP) for the PCI with the position data to validate an integrity of a fiber connection.

2. The method of claim 1, further comprising validating, by the mobile device, a power up of the radio at the cell site without detecting an alarm.

3. The method of claim 1, further comprising validating, by the mobile device, that a connection on a port of an antenna at the cell site is coupled to a low-band connection or a high-band connection.

4. The method of claim 1, further comprising validating, by the mobile device, Remote Electrical Tilt (RET) angles of an antenna at the cell site through a normal range of movement.

5. The method of claim 1, further comprising validating, by the mobile device, a signal to noise (S/N) ratio of a signal received by the mobile device while an antenna at the cell site has at a Remote Electrical Tilt (RET) angle.

6. The method of claim 1, wherein the mobile device verifies the position data and validates the measurement of the VSWR before the cell site is commissioned.

7. A method of testing a cell site, comprising:
capturing, on a mobile device located at the cell site, a transmission from a radio at the cell site;
receiving, on the mobile device, position data while capturing the transmission;
verifying, by the mobile device and before the cell site is commissioned, the position data identifies the cell site;
receiving, on the mobile device, a signal from the radio at the cell site at a frequency; and
validating, on the mobile device and before the cell site is commissioned, a measurement of a voltage standing wave ratio (VSWR) of the signal at the frequency.

8. The method of claim 7, further comprising validating, by the mobile device, a power up of the radio at the cell site without detecting an alarm.

9. The method of claim 7, further comprising validating, by the mobile device, that a connection on a port of an antenna at the cell site is coupled to a low-band connection or a high-band connection.

10. The method of claim 7, further comprising validating, by the mobile device, Remote Electrical Tilt (RET) angles of an antenna at the cell site through a normal range of movement.

11. The method of claim 7, further comprising validating, by the mobile device, a signal to noise (S/N) ratio of a signal received by the mobile device while an antenna at the cell site has at a Remote Electrical Tilt (RET) angle.

12. The method of claim 7, further comprising validating an assignment of a physical cell identifier (PCI) of a band at the cell site.

13. The method of claim 12, further comprising comparing an optimum value of a Reference Signal Received Power (RSRP) for the PCI with the position data to validate an integrity of a fiber connection.

14. A method of testing a cell site, comprising:
capturing, on a mobile device located at the cell site, a transmission from a radio at the cell site;
receiving, on the mobile device, position data while capturing the transmission;
verifying, by the mobile device and before the cell site is commissioned, the position data identifies the cell site; and
validating, on the mobile device and before the cell site is commissioned, a measurement of a voltage standing wave ratio (VSWR) of a signal from the cell site.

15. The method of claim 14, further comprising validating, by the mobile device, a power up of the radio at the cell site without detecting an alarm.

16. The method of claim 14, further comprising validating, by the mobile device, that a connection on a port of an antenna at the cell site is coupled to a low-band connection or a high-band connection.

17. The method of claim 14, further comprising validating, by the mobile device, Remote Electrical Tilt (RET) angles of an antenna at the cell site through a normal range of movement.

18. The method of claim 14, further comprising validating, by the mobile device, a signal to noise (S/N) ratio of a signal received by the mobile device while an antenna at the cell site has at a Remote Electrical Tilt (RET) angle.

19. The method of claim 14, further comprising validating an assignment of a physical cell identifier (PCI) of a band at the cell site.

20. The method of claim 19, further comprising comparing an optimum value of a Reference Signal Received Power (RSRP) for the PCI with the position data to validate an integrity of a fiber connection.

\* \* \* \* \*